United States Patent
Sedlak et al.

(10) Patent No.: US 10,857,872 B2
(45) Date of Patent: Dec. 8, 2020

(54) VEHICLE FRONT STRUCTURE

(71) Applicant: Volvo Car Corporation, Gothenburg (SE)

(72) Inventors: Vojtech Sedlak, Gothenburg (SE); Lennert Sterken, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 16/571,472

(22) Filed: Sep. 16, 2019

(65) Prior Publication Data
US 2020/0086734 A1     Mar. 19, 2020

(30) Foreign Application Priority Data
Sep. 18, 2018   (EP) ..................................... 18195102

(51) Int. Cl.
| | |
|---|---|
| *B60K 11/00* | (2006.01) |
| *B60K 11/08* | (2006.01) |
| *B62D 35/00* | (2006.01) |
| *B62D 37/02* | (2006.01) |

(52) U.S. Cl.
CPC .......... *B60K 11/085* (2013.01); *B62D 35/005* (2013.01); *B62D 37/02* (2013.01)

(58) Field of Classification Search
CPC .... B60K 11/085; B60K 11/08; B62D 35/005; B62D 37/02
USPC ...................................................... 180/68.1
See application file for complete search history.

(56) References Cited

U.S. PATENT DOCUMENTS

| | | | | |
|---|---|---|---|---|
| 4,379,582 A | * | 4/1983 | Miwa .................. | B62D 35/005 296/180.5 |
| 6,302,228 B1 | * | 10/2001 | Cottereau ............. | B60K 11/08 180/68.1 |
| 8,469,128 B2 | * | 6/2013 | Van Buren .......... | B60K 11/085 180/68.1 |
| 8,473,164 B2 | * | 6/2013 | Charnesky .......... | B60K 11/085 701/49 |

(Continued)

FOREIGN PATENT DOCUMENTS

| | | |
|---|---|---|
| DE | 3933199 C1 | 12/1990 |
| DE | 102010026323 A1 | 1/2012 |

(Continued)

OTHER PUBLICATIONS

Mar. 8, 2019 European Search Report issue on International Application No. EP18195102.

*Primary Examiner* — Ruth Ilan
*Assistant Examiner* — Hilary L Johns
(74) *Attorney, Agent, or Firm* — Clements Bernard Walker; Christopher L. Bernard (57) ABSTRACT

A vehicle front structure comprising: a shutter unit comprising adjustable flaps arranged to receive an airflow to control the supply of air that passes through the shutter unit towards at least one vehicle component. An air duct extending in a rearward direction from a front part of the vehicle, the air duct comprising an inlet and an outlet. In a first state of the shutter unit, a first flap is configured to be in a closed state to thereby reduce the supply of air through the shutter unit, and allow an airflow to pass through the inlet of the air duct. In a second state of the shutter unit, the first flap is configured to be in an open state to increase the supply of air through the shutter unit, and to close the inlet of the air duct.

15 Claims, 7 Drawing Sheets

(56) References Cited

U.S. PATENT DOCUMENTS

| | | | | |
|---|---|---|---|---|
| 8,645,028 B2* | 2/2014 | Mochizuki | B60K 11/085 | 701/49 |
| 8,646,552 B2* | 2/2014 | Evans | B60R 19/18 | 180/68.1 |
| 8,689,917 B2* | 4/2014 | Miesterfeld | F01P 7/10 | 180/68.1 |
| 9,744,848 B2* | 8/2017 | Ho | B60K 11/04 | |
| 10,647,194 B1* | 5/2020 | Burtch | B60K 11/085 | |
| 2004/0002298 A1* | 1/2004 | Osada | B60H 1/3421 | 454/155 |
| 2012/0067655 A1* | 3/2012 | Charnesky | B60K 11/085 | 180/68.1 |
| 2012/0090906 A1* | 4/2012 | Charnesky | B60K 11/085 | 180/68.1 |
| 2012/0240757 A1* | 9/2012 | Schade | F41H 5/026 | 89/36.02 |
| 2012/0270490 A1* | 10/2012 | Turner | F01P 7/12 | 454/75 |
| 2013/0092462 A1* | 4/2013 | Chinta | B60K 11/085 | 180/68.1 |
| 2015/0321547 A1* | 11/2015 | Pickl | B62D 37/02 | 180/68.1 |
| 2016/0016617 A1* | 1/2016 | Wolf | B60K 11/085 | 296/208 |
| 2016/0176450 A1* | 6/2016 | Wolf | B60K 11/04 | 180/68.2 |
| 2016/0297295 A1* | 10/2016 | Wolf | B60K 11/085 | |
| 2017/0050509 A1* | 2/2017 | Aizawa | B60R 19/52 | |
| 2017/0233012 A1* | 8/2017 | Legrice | B62D 37/02 | 180/89.17 |
| 2018/0015819 A1* | 1/2018 | Froling | B60K 11/04 | |
| 2018/0229780 A1* | 8/2018 | Thompson | B62D 35/005 | |
| 2018/0264930 A1* | 9/2018 | Blackford | B60K 11/04 | |
| 2019/0001810 A1* | 1/2019 | Fujitani | B60K 11/085 | |
| 2019/0143804 A1* | 5/2019 | Moestam | B60K 11/085 | 180/68.1 |
| 2019/0315224 A1* | 10/2019 | Mitidieri | F28F 27/02 | |

FOREIGN PATENT DOCUMENTS

| | | | | |
|---|---|---|---|---|
| EP | 0535255 A1 * | 4/1993 | | F01P 7/026 |
| EP | 0535255 A1 | 4/1993 | | |
| JP | 2003035224 A * | 2/2003 | | B60K 11/04 |
| JP | 2003035224 A | 2/2003 | | |
| WO | 2017037251 A1 | 3/2017 | | |
| WO | WO-2019048711 A1 * | 3/2019 | | B60K 11/085 |

* cited by examiner

VEHICLE FRONT STRUCTURE

CROSS-REFERENCE TO RELATED APPLICATION

The present disclosure claims the benefit of priority of co-pending European Patent Application No. 18195102.1, filed on Sep. 18, 2018, and entitled "VEHICLE FRONT STRUCTURE," the contents of which are incorporated in full by reference herein.

FIELD OF THE INVENTION

The present invention relates to a vehicle front structure comprising a shutter.

BACKGROUND OF THE INVENTION

Vehicles typically comprise a grille which allows air to enter the vehicle front part. The air is passed through a shutter before it reaches a cooler such as a radiator arranged for cooling the vehicle engine. In order to increase the air flow to the radiator when the shutter is open air guides may be arranged to guide the air towards the shutter. In addition, when the shutter is closed the air guide may help to reduce the leakage of air passed the shutter and into the engine space of the vehicle.

When controlling the air flow through the shutter, the aerodynamics of the air flow around the vehicle is affected depending on the state of the shutter. For instance when the shutter is in the closed state, which typically occur when the vehicle is in no need for cooling, no or little air is allowed through the shutter and the aerodynamic drag on the vehicle is for the most part reduced due to decreased air flow through the cooling and engine bay of the vehicle. However, this leads to strong pressure build up in the front of the vehicle, in front of shutters, that can create separation areas as the blocked air is trying to realign with exterior flow. This unfortunately leads to e.g. increased fuel consumption and $CO_2$ emissions. To reduce these separation areas ducts are typically introduced to bleed high pressure air to areas where pressure is lower.

WO2017/037251 describes a vehicle comprising a heat exchanger cooled by cooling air introduced through an inlet of a cooling duct. The flow of air through inlet is controlled by a grille-shutter system. An air duct is arranged separate from the cooling duct and is intended to reduce the aerodynamic drag on the vehicle.

However, the cooling performance for the heat exchanger is affected by the presence of the air duct described in WO2017/037251. Part of the air flow will be directed through the air duct which air flow otherwise may have been used for cooling the heat exchanger.

Accordingly, there appears to be room for improvement with regards to controlling the air flow at the front of vehicles.

SUMMARY

In view of above-mentioned prior art, it is an object of the present invention to provide a vehicle front structure which provides for controlling the air flow for at least maintained cooling performance for vehicle components and reduced drag on the vehicle front structure.

According to a first aspect of the invention, there is provided a vehicle front structure comprising: a shutter unit comprising adjustable flaps arranged to receive an airflow when the vehicle is moving and to control the supply of air that passes through the shutter unit towards at least one vehicle component for cooling the vehicle component, an air duct extending in a rearward direction from a front part of the vehicle, the air duct comprising an inlet at the front part of the vehicle and an outlet, wherein the inlet and a first flap of the shutter unit are arranged adjacent to each other such that in a first state of the shutter unit, the first flap is configured to be in a closed state to thereby reduce the supply of air through the shutter unit, and allow an airflow to pass through the inlet of the air duct, and in a second state of the shutter unit, the first flap is configured to be in an open state to thereby increase the supply of air through the shutter unit, and to close the inlet of the air duct to thereby at least partly block the air flow through the air duct.

The present invention is based on the realization that one of the flaps of the shutter unit may be used as a dual function flap to control the flow of air through the shutter unit and to control the flow of air through the air duct intended for reducing the aerodynamic drag. The arrangement of the first flap as a dual function flap allows for synchronized control of closing the air duct when the shutter unit is opening, and opening the air duct when the shutter unit is closing.

Accordingly, the invention provides advantages in relation to reduced aerodynamic drag, reduced $CO_2$ emissions, and improved cooling performance for the vehicle component. In addition, since the first flap is configured as a dual-function flap, i.e. to both serve as a flap for the shutter unit functionality and to open and close the air duct, packaging in the vehicle front structure is facilitated because there is no need for additional hardware for controlling the airflow through the air duct.

A shutter unit generally comprises flaps to control the air flow and to redirect the air flow towards the vehicle component in need of cooling. The flaps may have a relatively planar shape and are rotatable such as to close or open an inlet of the shutter unit through which inlet air flows towards the vehicle component. Thus, the flaps may for example block the air flow or allow the air flow through the shutter unit by a rotational movement of the flaps. The flaps may have a cross-section in a plane perpendicular to the air flow direction, in which cross section the length in a first direction is substantially larger than in a second direction.

In the second state of the shutter unit, when air is allowed through the shutter unit, the flaps are rotationally arranged such that the narrower dimension, i.e. in the second direction of the flaps are substantially perpendicular to the air flow and the flaps are not overlapping each other.

In the first state the flaps are rotationally arranged such that the narrower dimension, i.e. in the second direction of the flaps, is substantially parallel to the air flow and the flaps partly overlap each other.

The at least one vehicle component may comprise a cooling device.

A cooling device may generally serve to provide cooling fluid or cooled fluid to the engine or other areas such as an air conditioning of the vehicle. For example, for one possible cooling device the cooling fluid exchanges heat with the engine and the heated fluid is returned to the cooling device where is it cooled by the inflow or air through the shutter. A cooling device may be generally known as a radiator for cooling a vehicle engine.

Another example possible vehicle component is an energy storage device such as a battery pack. A battery pack may heat up as if discharges for providing electrical current to other systems of the vehicle and may therefore be in need of cooling. Similarly, when the battery pack is being charged it may heat up and be in need of cooling. The battery pack may for example be configured to provide electric power to the driveline of an electric or hybrid vehicle.

In the first state of the shutter unit the flaps are arranged to reduce the air flow through the shutter unit and towards the vehicle component. To reduce the air flow includes blocking the air flow. However, some air may still slip through the shutter unit due to mismatch of flaps or other tolerances in manufacturing. Thus the airflow in the first state is at least reduced compared to in the second state. In the first state, at least part of the air flow is diverted into the air duct.

Accordingly, in the second state the flaps are arranged to allow an air flow through the shutter unit and towards the vehicle component. The shutter unit is thereby in an open state. Thus the flow of air through the shutter unit and towards the vehicle component is increased compared to in the first state.

The flaps may be made from relatively rigid materials such as materials comprising polymers, e.g. plastic materials. Softer plastics or rubber may be arranged along rims of the flaps to better seal against neighboring flaps in the closed state of the shutter unit.

In some embodiments of the invention, the first flap may be configured to redirect air from the closed inlet of the air duct and towards the vehicle components, when the first flap is in the open state. Accordingly, the air that otherwise would flow through the air duct is diverted towards the vehicle components. In this way the air flow towards the vehicle component in the second state of the shutter unit is further increased and the cooling performance improved.

According to embodiments, the first flap may be configured to redirect air from the shutter unit towards inlet of the air duct, when the first flap is in the closed state. Thus, air is diverted from the closed shutter and into the air duct by the first flap. Hereby, the aerodynamic drag on the vehicle front structure is further reduced and thereby also the fuel consumption and $CO_2$ emissions.

According to embodiments, the first flap may comprise a convex surface on a first side facing the airflow in the closed state of the first flap. The convex surface advantageously redirects air into the air duct.

According to embodiments, the surface of the first flap on a second side facing the airflow in the open state of the first flap comprises an S-shaped cross-section. The S-shaped surface portion advantageously provides for redirecting air from the inlet of the air duct towards the shutter unit and finally to the vehicle component.

According to embodiments, the first flap may be rotatable through a larger rotational angle than the other flaps of the shutter unit, when the shutter unit transitions from one of the first state and the second state to the other one of the first state and the second state. Thus, the first flap is rotated further as compared to the other flaps of the shutter unit in order to more efficiently block the inlet of the air duct which is arranged adjacent the first flap, and at the same time increase the air flow into the shutter unit.

The first flap may take several forms, and in several possible implementations may the first flap be asymmetric. The asymmetry may lie in a cross-section in a plane separating the first side and the second side of the first flap. The first side and the second side are the sides arranged to redirect air flow in the different states of the shutter unit.

In embodiments, the first flap may comprise two portions on each side of a center of rotation of the first flap, wherein in the first state a first portion of the first flap is configured to reduce the supply of air through the shutter unit, and allow an airflow to pass through the inlet of the air duct, and a second portion of the first flap is arranged at least partly along the air flow direction in the air duct such as to allow the airflow to pass through the inlet of the air duct, and in the second state, the first portion is configured to increase the supply of air through the shutter unit, and the second portion is configured to at least partly block the air flow through the air duct. Thus, the first flap may advantageously comprise two portions arranged at a diverting angle with respect to each other. Hereby, one advantageous way of controlling the flow of air thought the air duct is provided.

The shutter unit may comprise multiple flaps, wherein the first flap has a shape that is different from the shape of the other flaps.

The flaps other than the first flap may have various forms and is not limited to a specific form as long as they serve to open and close the flow of air through the shutter unit.

The first flap may be a top flap of the shutter and the outlet of the air duct is arranged to guide the air to a hood of the vehicle. The top flap may be the uppermost flap of the shutter unit, whereby the air duct is an upper air duct.

In other embodiments, the first flap may be a bottom flap of the shutter and the outlet of the air duct is arranged to guide the air to below the vehicle. The bottom flap may thus be a lowermost flap of the shutter unit and the air duct may be a lower air duct.

In some embodiments, the shutter unit comprises both the top flap and the bottom flap, and thus also the lower and upper air duct. In accordance with the inventive concept, there is also provided a vehicle comprising a vehicle front structure.

According to a second aspect of the invention there is provided a method for controlling a supply of air that passes through a shutter unit towards at least one vehicle component, and for controlling an airflow through an air duct extending in a rearward direction from a front part of the vehicle, the air duct comprising an inlet arranged adjacent a first flap of the shutter unit, the method comprises the steps of: controlling the shutter to be in a first state in which the first flap reduces the supply of air through the shutter unit, and allows an airflow to pass through the inlet of the air duct, and controlling the shutter to be in a second state in which the first flap in an open state to thereby increase the supply of air through the shutter unit, and at the same time closes the inlet of the air duct to thereby at least partly block the air flow through the air duct.

Effects and features of the second aspect of the invention are largely analogous to those described above in connection with the first aspect of the invention.

In summary, the present invention relates to a vehicle front structure comprising: a shutter unit comprising adjustable flaps arranged to receive an airflow to control the supply of air that passes through the shutter unit towards at least one vehicle component. An air duct extending in a rearward direction from a front part of the vehicle, the air duct comprising an inlet and an outlet In a first state of the shutter unit, the first flap is configured to be in a closed state to thereby reduce the supply of air through the shutter unit, and allow an airflow to pass through the inlet of the air duct. In a second state of the shutter unit, the first flap is configured to be in an open state to increase the supply of air through the shutter unit, and to close the inlet of the air duct.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing example embodiments of the invention, wherein.

DETAILED DESCRIPTION OF EXAMPLE EMBODIMENTS

In the present detailed description, various embodiments of the system and method according to the present invention are mainly described with reference to a vehicle in the form of a car. However, the present invention may equally be used for any other type of vehicle having shutters such as a trucks or busses. Thus, this invention may be embodied in many different forms and should not be construed as limited to the embodiments set forth herein; rather, these embodiments are provided for thoroughness and completeness, and fully convey the scope of the invention to the skilled person. Like reference characters refer to like elements throughout.

Figure 1:
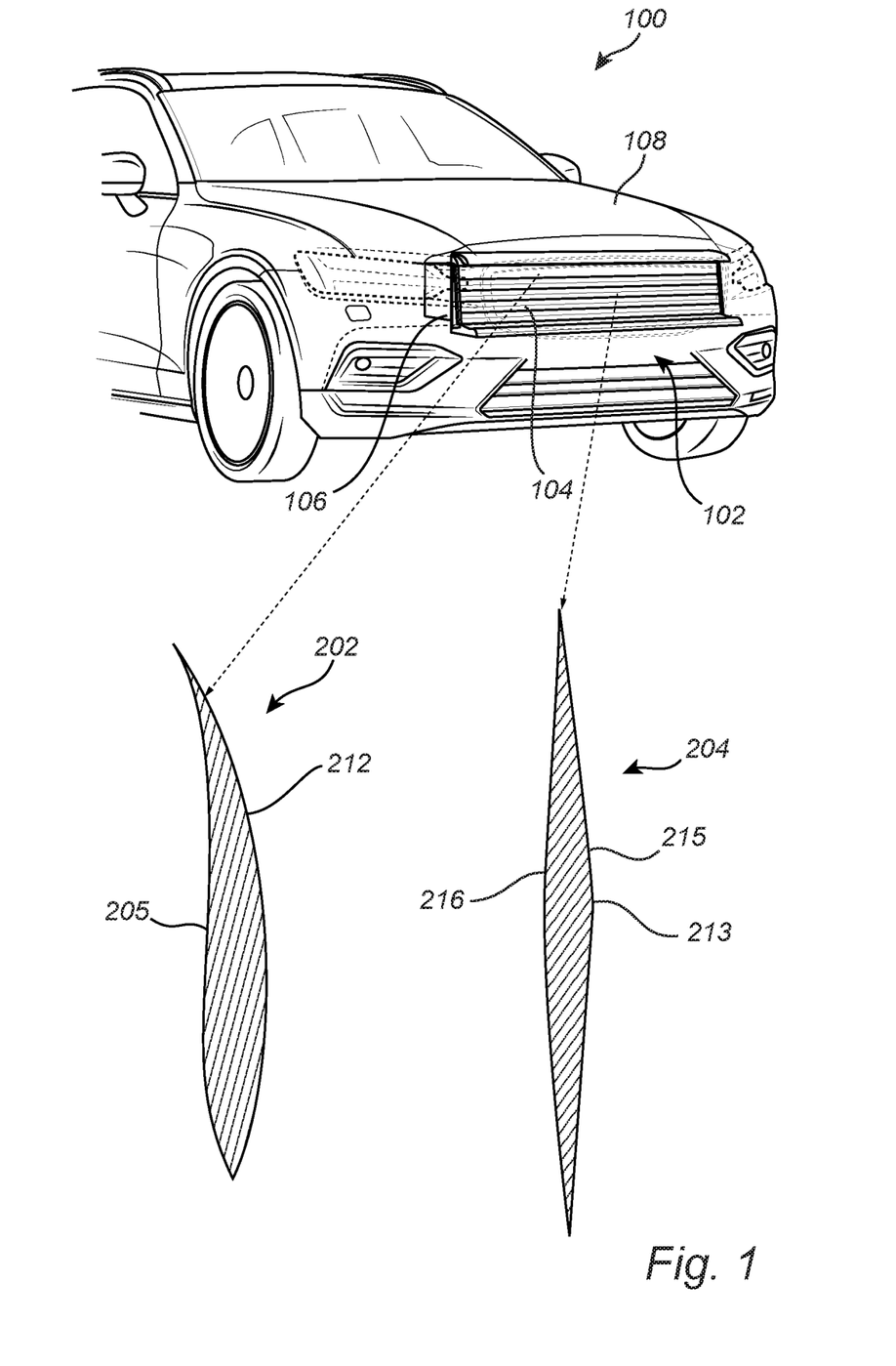
FIG. 1 conceptually illustrates a vehicle comprising a front structure according to an example embodiment of the invention.

FIG. 1 shows a vehicle 100 comprising a vehicle front structure 102. The vehicle comprises a vehicle component at least occasionally in need cooling. The vehicle component is in this example embodiment a cooling device 106 arranged in the front structure 102. The cooling device 106, e.g. a radiator is generally used for cooling an engine or other areas such as the air conditioning functionality of the vehicle 100 by providing cooled fluid to the vehicle engine (or other areas).

In one possible implementation, the engine exchanges heat with the cooling fluid, which thereby transports the heated cooling fluid back to the cooling device 106. In the cooling device 106, the cooling fluid is again cooled, and the cooling is at least partly accomplished by airflow from the forward direction of the vehicle. The airflow is generated when the vehicle 100 is travelling.

In front of the cooling device 110, in the forward direction of the vehicle 100, is a shutter unit 104 arranged to control the air flow coming from the forward direction and supplied to the cooling device 106. The shutter unit 104, may for example at least partly block the air flow from reaching the cooling device 106, or allow the air flow through the shutter unit 104 and towards the cooling device 106. The shutter unit 104 comprises flaps arranged to redirect the air flow, for instance block or allow the air flow to pass to the cooling device 106, or continuously adjust the air flow to the cooling device 106. The flaps are rotatable about an axis for blocking or allowing air to pass through the shutter unit 104.

In front of the shutter unit 104 there may be a grill (not shown) which is air permeable to allow the air flow to reach the shutter unit 104.

Figure 2A:
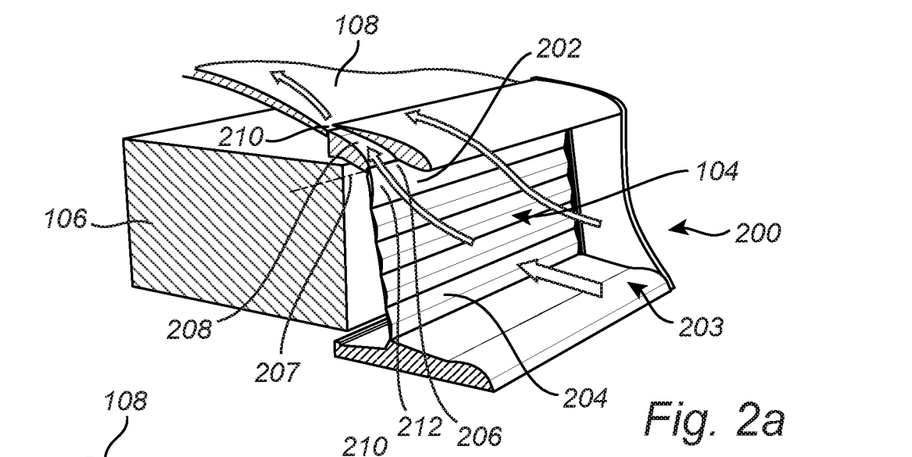
FIG. 2a conceptually illustrates a partial front side view of a vehicle front structure according to an example embodiment of the invention with the shutter unit in a first state.

FIG. 2a schematically illustrates a perspective cross-sectional view of a vehicle front structure 200 according to embodiments of the invention. As mentioned in relation to FIG. 1, a shutter unit 104 is arranged behind a grille (not shown) arranged in a front grille opening 203. In FIG. 2a the shutter unit 104 is in its first state.

The shutter unit 104 comprises adjustable flaps 204 (only one is numbered) and a first flap, here a top flap 202 which is also adjustable by means of rotation. The flaps 202, 204 are arranged to receive an air flow when the vehicle is moving. The adjustment of the flaps 202, 204 comprises to rotate the flaps 202, 204 about a respective rotation axis (for instance 207) such that the flaps 202, 204 either turns their widest side towards the air flow or turns the widest side perpendicular to the air flow. In FIG. 2a, the flaps 202, 204 have their wide side facing forward such that the air flow is at least partly prevented from passing through the shutter unit 104 and reach the radiator 106. The flaps 204, 202 partly overlap in this first state of the shutter unit 104.

Accordingly, the top flap 202 and the other flaps 204 are a closed state to reduce or even block the supply of air through the shutter unit 104.

Adjacent to the top flap 202 is the inlet 206 of an air duct 208 arranged. The air duct 208 is configured to allow an air flow to flow in a rearward direction from the inlet 206 facing in a forward direction of the vehicle. In this first state of the shutter unit 104 air flow is guided by the air duct 208 to an outlet 210 near the hood 108 of the vehicle. The air duct 208 is arranged to reduce the pressure build up in the vehicle front structure to reduce the aerodynamic drag.

In this first state of the shutter unit 104 and closed state of the top flap 202, the top flap 202 may further be configured to redirect air flow from the shutter unit 104 to the inlet 206 of the air duct 208. The surface of the first side 212 of the flap 202 facing the air flow in this first state of the shutter unit and closed state of the top flap 202 is convex. Thereby air flow is diverted by the convex first side 212 of the top flap 202 into the air duct 208 which leads the air flow to the outlet 210 up over the hood 108 of the vehicle. The first side 212 faces into the air duct 208 in the second state of the shutter unit 104.

The shape of the other flaps 204 may take various forms within the scope of the present disclosure. For example, the flaps 204 may comprise two surface portions 215 and 216 facing the air flow in the first state of the shutter unit 104. The two surface portions may be angled with respect to each other such that a ridge 213 is formed along a longitudinal extension of the flaps 204.

Figure 2B:
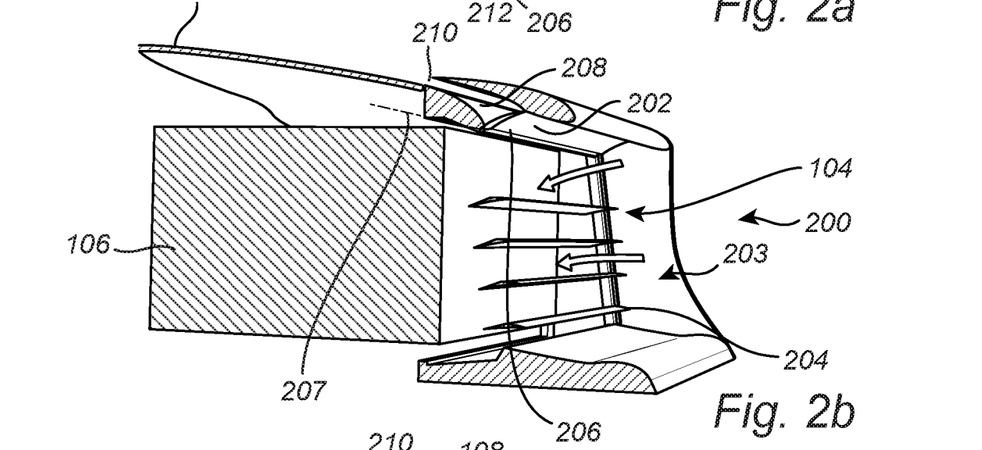
FIG. 2b conceptually illustrates a partial front side view of a vehicle front structure according to an example embodiment of the invention with the shutter unit in a second state.

FIG. 2b schematically shows the vehicle front structure 200 shown in FIG. 2a, with the shutter unit 104 in a second state. In this second state the top flap 202, and the other flaps 204 are in an open state to increase the supply of air through the shutter unit 104 and towards the radiator 106. The flaps 204 have been rotated such that the wide sides of the flaps 204 are now facing upwards. The flaps 204 have been rotated through about 90 degrees.

The top flap 204 have also been rotated to an orientation where it blocks the inlet 206 of the air duct 208 such that the air flow through the duct 208 is at least partly prevented. The top flap 202 is configured to redirect air from the closed inlet 206 of the air duct 208 and towards the vehicle components, here a radiator 106, when the top flap 202 is in the open state as shown in FIG. 2b.

In order to improve the diversion of air by the top flap a second side 205 of the top flap 202 may be generally S-shaped according to one embodiment. The second side 205 faces away from the air flow in the first state of the shutter unit.

Similar to the flaps 204 has the top flap 202 also been rotated in order to transition from the closed state to the open state. However, the top flap 202 has been rotated through a larger rotation angle in order to close the inlet 206. The top flap 202 may have to be rotated at least 100 degrees between its closed state and its open state.

Figure 2C:
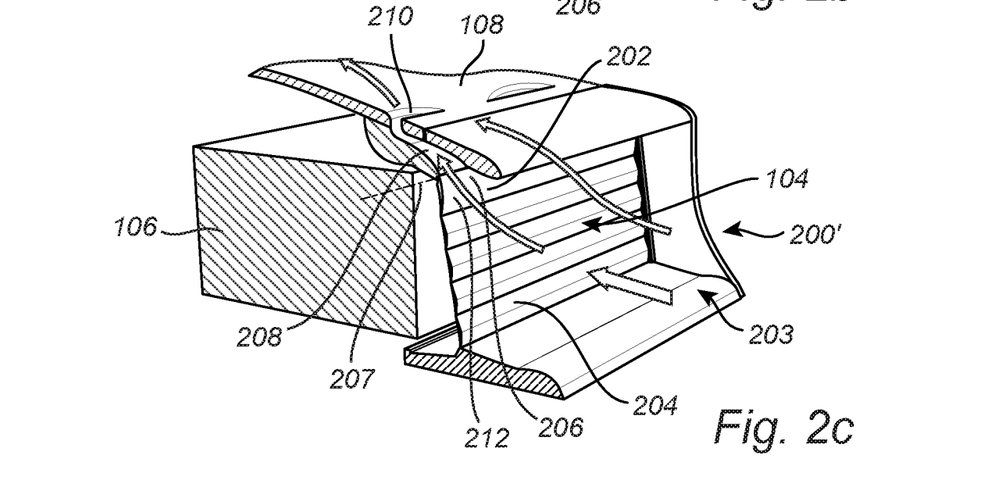
FIG. 2c conceptually illustrates a partial front side view of a vehicle front structure according to an example embodiment of the invention with the shutter unit in a first state.

In FIG. 2a-b and in other figures of the application the duct 208 is shown with its outlet 210 in front of the hood 108. This is shown for example purposes and the air duct may in other possible implementations lead the air to an intermediate part of the hood 108 such as close to the center or close to the rear part of the hood 108. FIG. 2c shows an example where the air duct 208 has its outlet 210 through the hood 108.

Figure 3A:
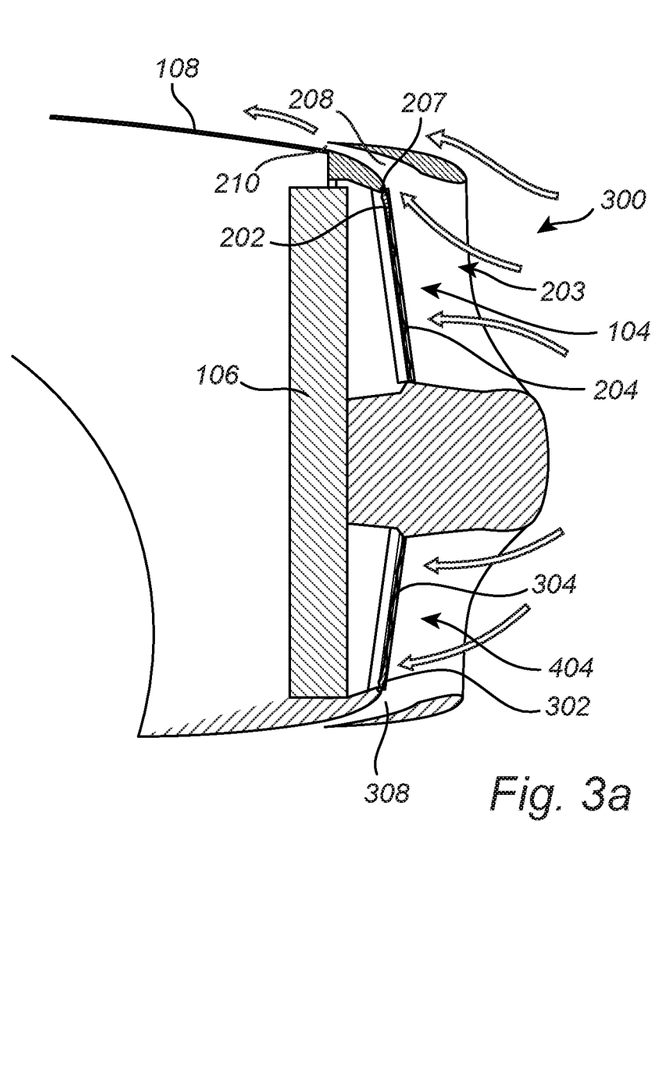
FIG. 3a conceptually illustrates a partial front side view of a vehicle front structure according to an example embodiment of the invention with the shutter unit in a first state.

FIG. 3a illustrates a cross-sectional side view of a vehicle front structure 300 according to a further embodiment of the invention. The vehicle front structure 300 comprises the top flap 202, the air duct 208, and the radiator 106 as described with reference to FIGS. 2a-b.

In addition, a further first flap arranged as a bottom flap 302 is arranged adjacent a lower air duct 304. The lower air duct 304 is arranged to guide the air to below the vehicle.

In the first state of the shutter unit 306 illustrated in FIG. 3a, the top flap is configured to be in a closed state to thereby reduce the supply of air through the shutter unit 304, and allow airflow to pass through the inlet of the upper air duct 208 as described with reference to FIGS. 2a-b. Similarly, the bottom flap is configured to be in a closed state to thereby reduce the supply of air through the shutter unit, and allow airflow to pass through the inlet of the bottom air duct 304.

Figure 3B:
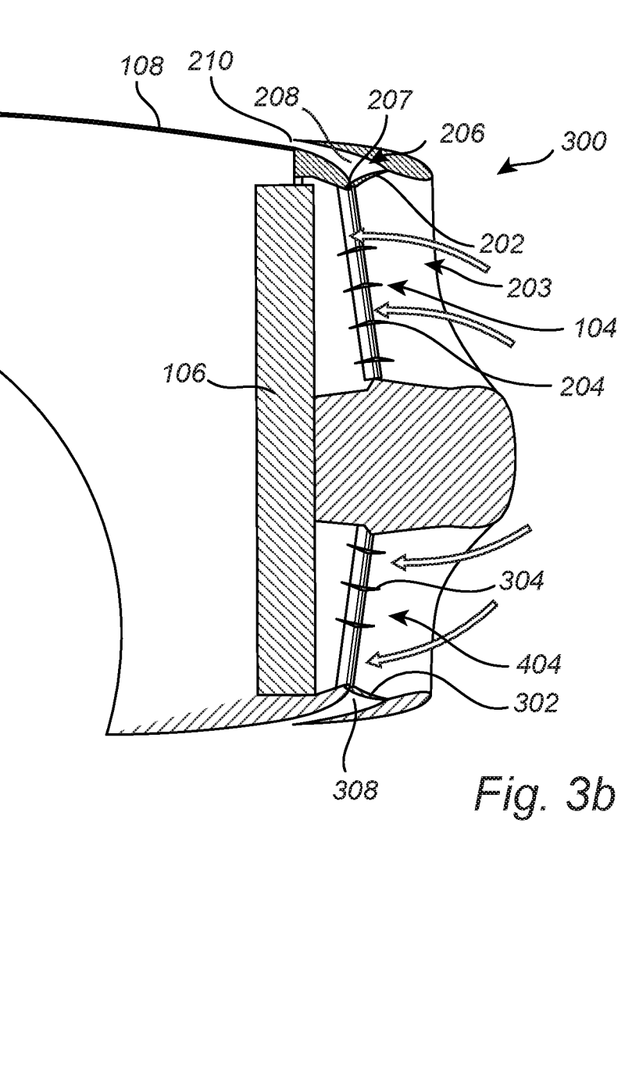
FIG. 3b conceptually illustrates a partial front side view of a vehicle front structure according to an example embodiment of the invention with the shutter unit in a second state.

In the second state of the shutter unit 306 illustrated in FIG. 3b, the top flap 202 is configured to be in an open state to thereby increase the supply of air through the shutter unit, and to close the inlet of the upper air duct 208 to thereby at least partly block the air flow through the air duct 208. Similarly, the bottom flap 202 is configured to be in an open state to thereby increase the supply of air through the shutter unit, and to close the inlet of the bottom air duct 308 to thereby at least partly block the air flow through the air duct 208.

The operation and configuration of the bottom flap 302 in relation to the lower air duct 304 is analogous to the operation of the top flap 202 in relation to the upper air duct 208.

Figure 4A:
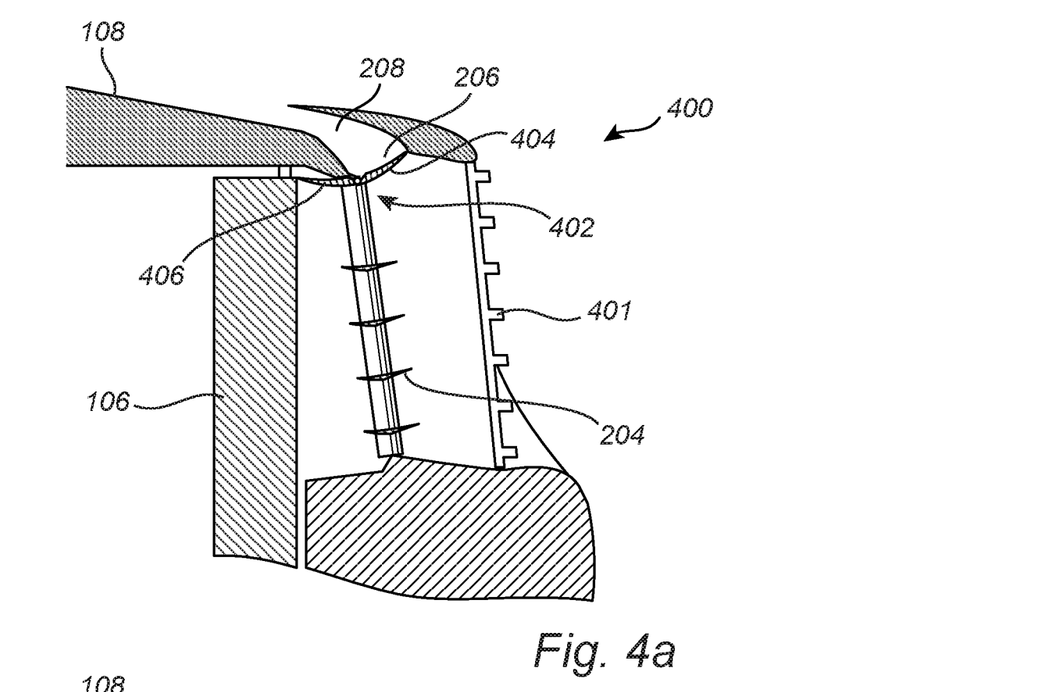
FIG. 4a conceptually illustrates a partial front side view of a vehicle front structure according to an example embodiment of the invention with the shutter unit in a second state.

FIG. 4a illustrates a cross-sectional side view of vehicle front structure 400 according to further embodiments of the invention. The flaps 204, the radiator 106, the air duct 208 with inlet 206, and the hood 108 was described with reference to FIG. 2a-b. The difference here, and also in FIGS. 4b-c is that the first flap shown as a top flap 402 comprises two portions, a first portion 404 and a second portion 406.

The first portion 404 and the second portion 406 are arranged angled with respect to each other such that the planes of the first portion 404 and the second portion 406 intercept. For instance, as shown in FIG. 4a, where the shutter unit 405 is shown in the second state, the first portion 404 is in an open state to allow the flow of air through the shutter unit, at the same time the second portion 406 is configured to block the inlet 206 of the air duct 208.

Figure 4B:
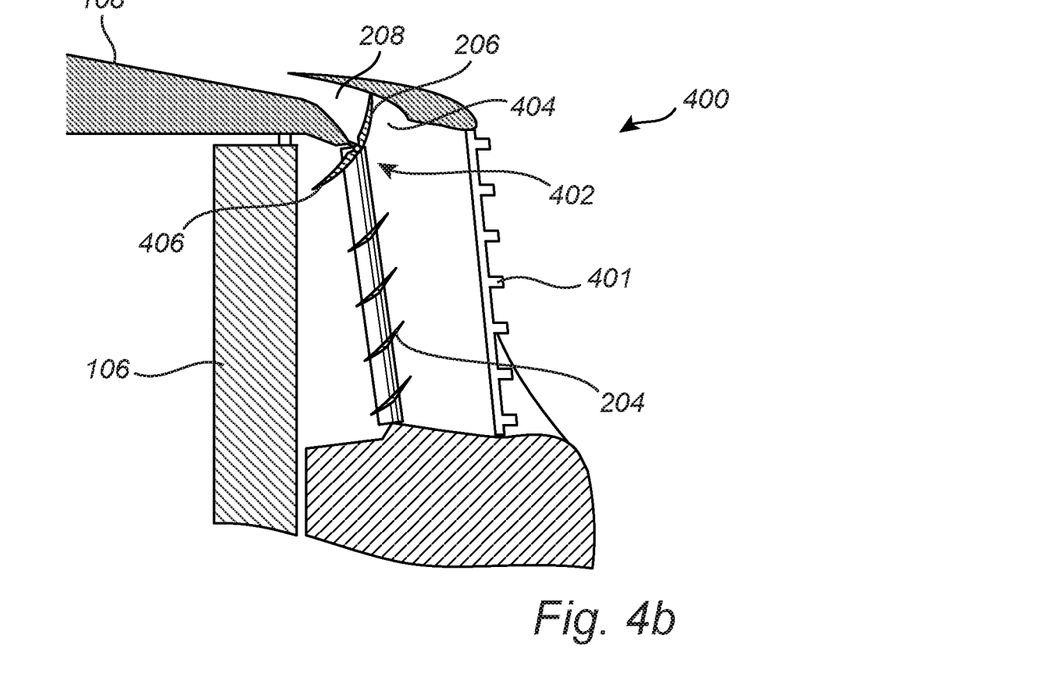
FIG. 4b conceptually illustrates a partial front side view of a vehicle front structure according to an example embodiment of the invention with the shutter unit in an intermediate state between the first state and the second state.
Figure 4C:
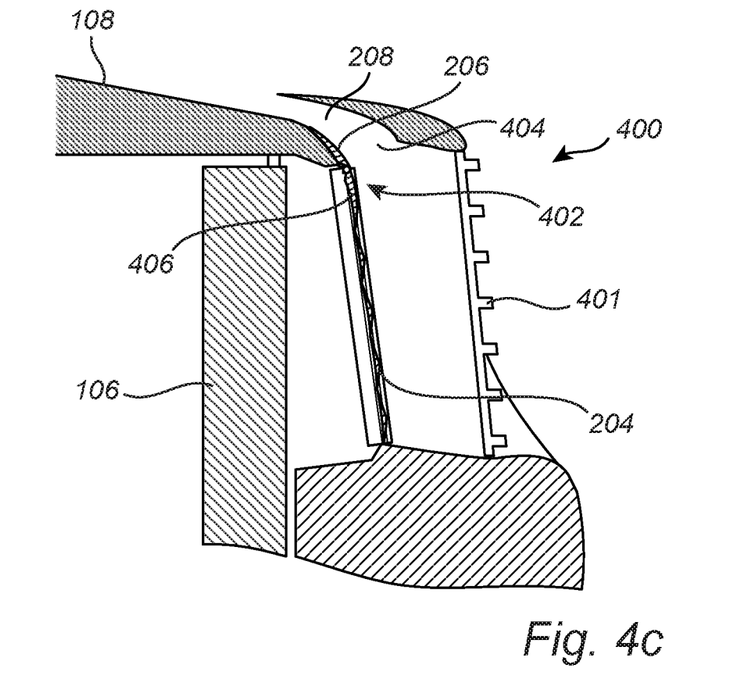
FIG. 4c conceptually illustrates a partial front side view of a vehicle front structure according to an example embodiment of the invention with the shutter unit in a first state.

FIG. 4b illustrates the vehicle front structure 400 in FIG. 4a, but with the shutter unit in an intermediate state where the flaps 404 and the top flap 402 is partly rotated with respect to the second state illustrated in FIG. 4c.

FIG. 4c illustrates the vehicle front structure in FIG. 4a-b but here with the shutter unit 405 in the first state, shown behind grille 401. The flaps 404 have been rotated through about 90 degrees compared to the second state shown in FIG. 4a. In this first state of the shutter unit, the first portion 404 of the first flap is configured to at least reduce the supply of air through the shutter unit. For instance, the first portion 404 contributes to preventing the air flow to pass through the shutter unit and reach the radiator 106. The second portion 406 of the first flap is arranged at least partly along the air flow direction in the air duct 208 such as to allow the airflow to pass through the inlet of the air duct. Thus, the second portion has been rotated into the air duct to in this way open the inlet 206 of the air duct 208.

In the depicted embodiments the air ducts are mainly referred to as upper or lower air ducts. However, in some possible implementations the air duct may be a left or right air duct arranged to the respective left or right side of the vehicle. Such possible implementations are shown in FIGS. 5a-b.

Figure 5A:
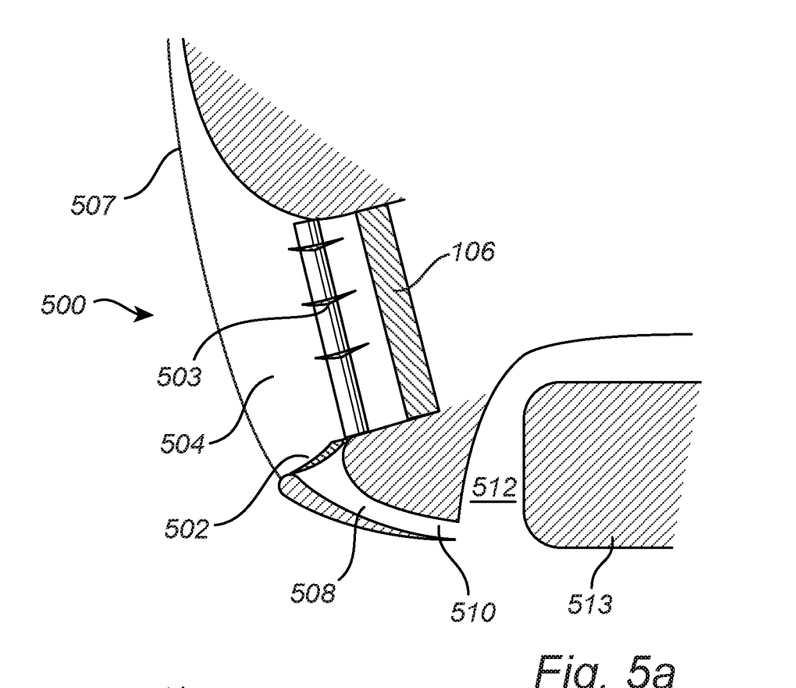
FIG. 5a conceptually illustrates a top view of a vehicle front structure according to an example embodiment of the invention with the shutter unit in a second state.
Figure 5B:
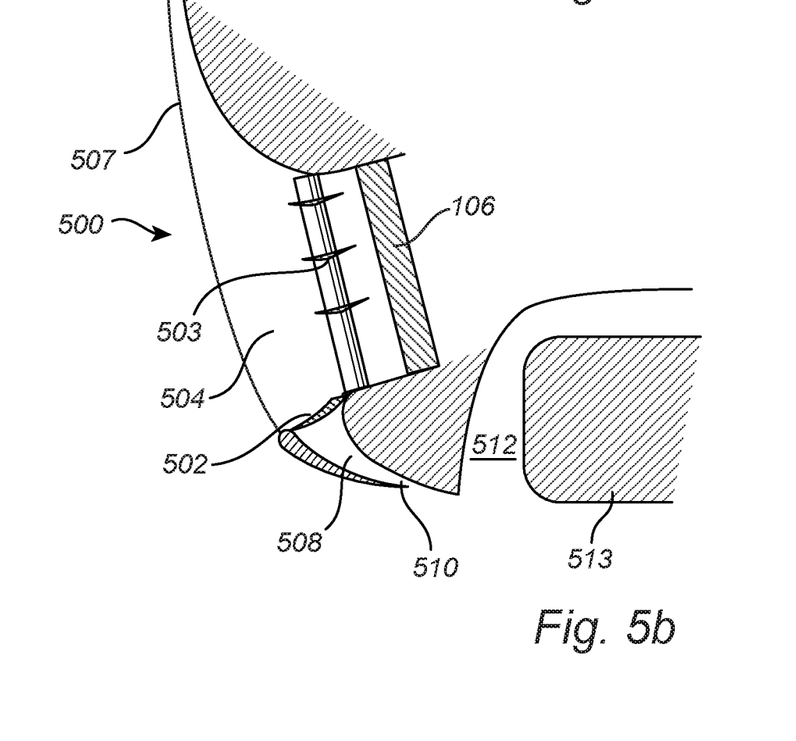
FIG. 5b conceptually illustrates a top view of a vehicle front structure according to an example embodiment of the invention with the shutter unit in a second state.

FIG. 5a is a top view of one possible implementation of embodiments of the invention. In this example vehicle front structure 500 a side air duct 508 is configured to lead the air from the front structure of the vehicle into a wheel house 512 of the vehicle where the wheel 513 is located. In other words, the outlet 510 of the air duct 508 faces the wheel house 512 on the corresponding side of the vehicle. There may be one right air duct and one left air duct leading the air to a respective right wheel house and left wheel house of the vehicle. This type of left or right air duct is often called an "air-curtain". There is further schematically shown part of the front bumper 507 of the vehicle.

Similar to the above described embodiments, a shutter unit 504 is arranged to receive an airflow when the vehicle is moving and to control the supply of air that passes through the shutter unit towards at least one vehicle component 106 at least sometimes in need of cooling, e.g. a radiator or a battery.

The shutter unit 104 comprises adjustable flaps 503 for controlling the air flow towards the component 106 and a first flap 502 configured to, in a first state of the shutter unit, be in a closed state to thereby reduce the supply of air through the shutter unit 504, and allow an airflow to pass through the inlet of the air duct 508. In a second state of the shutter unit 504, the first flap 502 is configured to be in an open state to thereby increase the supply of air through the shutter unit, and to close the inlet of the air duct 508 to thereby at least partly block the air flow through the air duct 508. In other words, the first flap 502 is configured in a similar way as the top flap 202,302,402 in the above described embodiments with reference to FIGS. 2-4. In FIG. 5a the shutter unit 504 is in its second state and the first flap 502 is in an open state.

FIG. 5b illustrates a further possible implementation of embodiments of the invention. The difference between the embodiment illustrated in FIG. 5b and the one illustrated in FIG. 5a is that the outlet 510 of the air duct 508 in the presently described embodiment in FIG. 5b is arranged in front of the wheel house 512 instead in the wheel house as in FIG. 5a. In other words, the air duct 508 in FIG. 5b leads the air to the side of the vehicle instead of into the wheel house 512. In FIG. 5b the shutter unit 504 is in its second state and the first flap 502 is in an open state.

Figure 6:
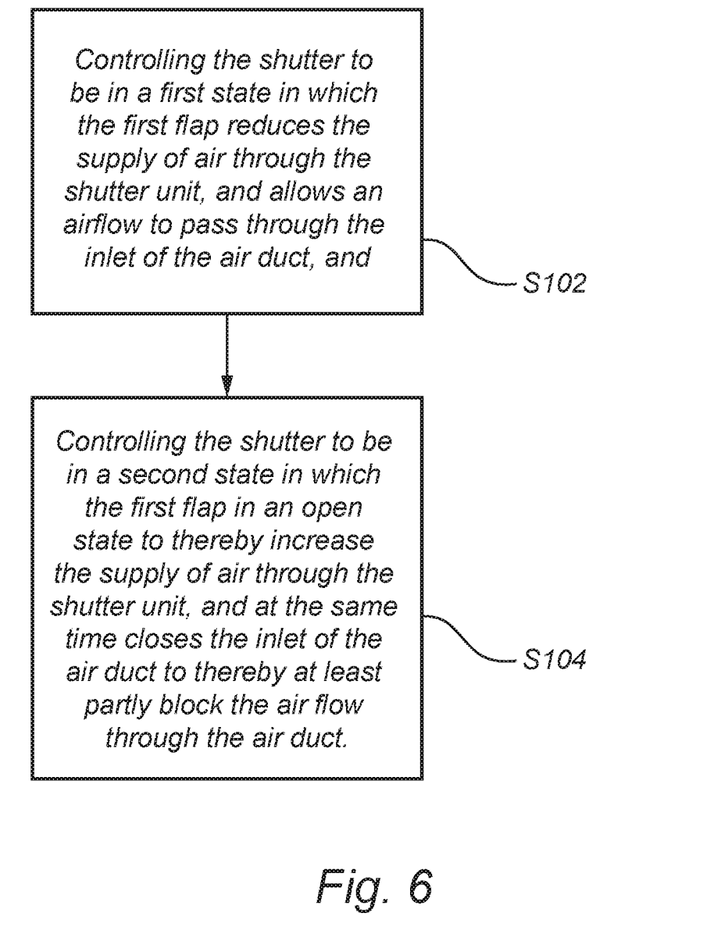
FIG. 6 is a flow-chart of method steps according to embodiments of the invention.

FIG. 6 is a flow-chart of method steps according to an embodiment of the invention. The method is for controlling a supply of air that passes through a shutter unit towards at least one vehicle component, and for controlling an airflow through an air duct extending in a rearward direction from a front part of the vehicle. The air duct comprises an inlet arranged adjacent a first flap of the shutter unit. In step S102 is the shutter unit controlled to be in a first state in which the first flap reduces the supply of air through the shutter unit, and allows airflow to pass through the inlet of the air duct. In step S104 the shutter unit is controlled to be in a second state in which the first flap in an open state to thereby increase the supply of air through the shutter unit, and at the same time closes the inlet of the air duct to thereby at least partly block the air flow through the air duct.

A shutter unit may be controlled by a vehicle control unit for adjusting the air flow to the vehicle components. The vehicle control unit may control the rotational orientation of the flaps and the first flap in order to vary the air flow that serves to cool the vehicle component. The vehicle control unit may receive signals from subsystems and/or sensors such as temperature sensors, which signals indicate the need for cooling. For example, a feedback control system may provide control signals to the vehicle control unit which in response to the control signal may provide its control signals to the shutter unit, whereby the flaps including the first flap(s) are rotated accordingly.

The flaps of the shutter unit may each be rotationally connected to a frame of the shutter unit. The rotational connection may be provided in various ways known per se in the art. For example, using an electric step-motor which will move a frame or rod to which flaps are rotationally connected. The moveable frame or rod can be of a single piece or a multilink construction. The flaps preferably rotate together at the same time. With a multilink construction it is possible to make one flap rotate further than the others.

The vehicle control unit may include a microprocessor, microcontroller, programmable digital signal processor or another programmable device. The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The person skilled in the art realizes that the present invention by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. A vehicle front structure, comprising:
   a shutter unit comprising adjustable flaps arranged to receive an airflow when the vehicle is moving and to control the supply of air that passes through the shutter unit towards at least one vehicle component for cooling the vehicle component,
   an air duct extending in a rearward direction from a front part of the vehicle, the air duct comprising an inlet at the front part of the vehicle and an outlet, wherein the inlet and a first flap of the shutter unit are arranged adjacent to each other such that,
   in a first state of the shutter unit, the first flap is configured to be in a closed state to thereby reduce the supply of air through the shutter unit, and allow an airflow to pass through the inlet of the air duct, and
   in a second state of the shutter unit, the first flap is configured to be in an open state to thereby increase the supply of air through the shutter unit, and to close the inlet of the air duct to thereby at least partly block the air flow through the air duct.

2. The vehicle front structure according to claim 1, wherein the first flap is configured to redirect air from the closed inlet of the air duct and towards the vehicle component, when the first flap is in the open state.

3. The vehicle front structure according to claim 1, wherein the first flap is configured to redirect air from the shutter unit towards the inlet of the aft duct, when the first flap is in the closed state.

4. The vehicle front structure according to claim 1, wherein the first flap comprises a convex surface on a first side facing the airflow in the closed state of the first flap.

5. The vehicle front structure according to claim 1, wherein the surface of the first flap on a second side facing the airflow in the open state of the first flap comprises an S-shaped cross-section.

6. The vehicle front structure according to claim 1, wherein the first flap is rotatable through a larger rotational angle than the other flaps of the shutter unit, when the shutter unit transitions from one of the first state and the second state to the other one of the first state and the second state.

7. The vehicle front structure according to claim 1, wherein the first flap is asymmetric.

8. The vehicle front structure according to claim 1, wherein the first flap comprises two portions on each side of a center of rotation of the first flap, wherein:
  in the first state a first portion of the first flap is configured to at least reduce the supply of air through the shutter unit, and allow an airflow to pass through the inlet of the air duct, and a second portion of the first flap is arranged at least partly along the air flow direction in the air duct such as to allow the airflow to pass through the inlet of the air duct, and
  in the second state, the first portion is configured to allow the supply of air through the shutter unit, and the second portion is configured to at least partly block the air flow through the air duct.

9. The vehicle front structure according to claim 1, wherein the shutter unit comprises multiple flaps, wherein the first flap has a shape that is different from the shape of the other flaps.

10. The vehicle front structure according to claim 1, wherein the first flap is a top flap of the shutter and the outlet of the air duct is arranged to guide the air to a hood of the vehicle.

11. The vehicle front structure according to claim 1, wherein the first flap is a bottom flap of the shutter and the outlet of the air duct is arranged to guide the air to below the vehicle.

12. The vehicle front structure according to claim 11, comprising the top flap and the bottom flap.

13. A vehicle comprising the vehicle front structure according to claim 1.

14. The vehicle according to claim 13, comprising the vehicle component.

15. A method for controlling a supply of air that passes through a shutter unit towards at least one vehicle component, and for controlling an airflow through an air duct extending in a rearward direction from a front part of the vehicle, the air duct comprising an inlet arranged adjacent a first flap of the shutter unit, the method comprising the steps of:
  controlling the shutter to be in a first state in which the first flap reduces the supply of air through the shutter unit, and allows an airflow to pass through the inlet of the air duct, and
  controlling the shutter to be in a second state in which the first flap in an open state to thereby increase the supply of air through the shutter unit, and at the same time closes the inlet of the air duct to thereby at least partly block the air flow through the air duct.

* * * * *